(12) United States Patent
Lee et al.

(10) Patent No.: US 11,984,612 B2
(45) Date of Patent: May 14, 2024

(54) BATTERY MODULE COMPRISING MODULE HOUSING

(71) Applicant: LG Chem, Ltd., Seoul (KR)

(72) Inventors: Seung-Yoon Lee, Daejeon (KR); Yong-Il Kim, Daejeon (KR); Yong-Seok Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 727 days.

(21) Appl. No.: 16/973,250

(22) PCT Filed: Oct. 23, 2019

(86) PCT No.: PCT/KR2019/014012
§ 371 (c)(1),
(2) Date: Dec. 8, 2020

(87) PCT Pub. No.: WO2020/101209
PCT Pub. Date: May 22, 2020

(65) Prior Publication Data
US 2021/0242525 A1 Aug. 5, 2021

(30) Foreign Application Priority Data
Nov. 12, 2018 (KR) .................. 10-2018-0138449

(51) Int. Cl.
*H01M 50/244* (2021.01)
*H01M 50/209* (2021.01)
(Continued)

(52) U.S. Cl.
CPC ....... *H01M 50/244* (2021.01); *H01M 50/209* (2021.01); *H01M 50/211* (2021.01);
(Continued)

(58) Field of Classification Search
CPC ........... H01M 2220/20; H01M 50/209; H01M 50/211; H01M 50/244; H01M 50/249; H01M 50/262
See application file for complete search history.

(56) References Cited

U.S. PATENT DOCUMENTS

| 5,543,248 A | 8/1996 | Dougherty et al. |
| 5,681,668 A | 10/1997 | Reed et al. |

(Continued)

FOREIGN PATENT DOCUMENTS

| CN | 102354774 A | 2/2012 |
| CN | 103270619 A | 8/2013 |

(Continued)

OTHER PUBLICATIONS

Extended European Search Report for Application No. EP 19885255. 0, dated Jul. 20, 2021, 10 pages.

(Continued)

*Primary Examiner* — Victoria H Lynch
(74) *Attorney, Agent, or Firm* — Lerner David LLP

(57) ABSTRACT

A battery module includes a module housing with a simplified assembling process and an improved energy density. The battery module includes a battery assembly configured to include a plurality of secondary batteries and has front, rear, upper, lower, left and right sides; and a module housing including a first frame located at the left side of the battery assembly and having a plate shape with opposing ends bent rightward so that bent portions thereof are respectively located at the upper side and the lower side of the battery assembly, and a second frame located at the right side of the battery assembly and having a plate shape with opposing ends bent leftward so that bent portions thereof are respec- (Continued)

tively located at the upper side and the lower side of the battery assembly and are coupled with the bent portions of the first frame, respectively.

11 Claims, 12 Drawing Sheets

(51) Int. Cl.
    *H01M 50/211*     (2021.01)
    *H01M 50/249*     (2021.01)
    *H01M 50/262*     (2021.01)

(52) U.S. Cl.
    CPC ....... *H01M 50/249* (2021.01); *H01M 50/262* (2021.01); *H01M 2220/20* (2013.01)

(56) References Cited

U.S. PATENT DOCUMENTS

| | | | |
|---|---|---|---|
| 2012/0114999 A1 | 5/2012 | Park et al. | |
| 2012/0244422 A1 | 9/2012 | Ushijima | |
| 2013/0280565 A1 | 10/2013 | Lee et al. | |
| 2015/0162648 A1* | 6/2015 | Yang | H01M 50/211 429/90 |
| 2017/0125774 A1 | 5/2017 | Choi et al. | |
| 2018/0138475 A1 | 5/2018 | Seo et al. | |
| 2018/0175464 A1 | 6/2018 | Kim et al. | |
| 2019/0051954 A1 | 2/2019 | Kim et al. | |

FOREIGN PATENT DOCUMENTS

| | | |
|---|---|---|
| CN | 106133948 A | 11/2016 |
| EP | 2808921 A1 | 12/2014 |
| JP | H11500261 A | 1/1999 |
| JP | 4741285 B2 | 8/2011 |
| JP | 2012204101 A | 10/2012 |
| JP | 6135532 B2 | 5/2017 |
| KR | 20160044322 A | 4/2016 |
| KR | 20160049863 A | 5/2016 |
| KR | 20160115533 A | 10/2016 |
| KR | 20170003754 A | 1/2017 |
| KR | 20170037125 A | 4/2017 |
| KR | 20170040638 A | 4/2017 |
| WO | 2018135756 A1 | 7/2018 |

OTHER PUBLICATIONS

International Search Report for Application No. PCT/KR2019/014012 dated Feb. 25, 2020, 4 pages.
Search Report dated May 18, 2022 from Office Action for Chinese Application No. 201930028926.2 dated May 24, 2022. 3 pgs.
Search Report dated Feb. 10, 2023 from Office Action for Chinese Application No. 201980028926.2 dated Feb. 15, 2023. 2 pgs.

\* cited by examiner

BATTERY MODULE COMPRISING MODULE HOUSING

CROSS-REFERENCE TO RELATED APPLICATIONS

The present application is a national phase entry under 35 U.S.C. § 371 of International Application No. PCT/KR2019/014012, filed Oct. 23, 2019, published in Korean, which claims priority to Korean Patent Application No. 10-2018-0138449 filed on Nov. 12, 2018 in the Republic of Korea, the disclosures of which are incorporated herein by reference.

TECHNICAL FIELD

The present disclosure relates to a battery module including a module housing having a first frame and a second frame, and more particularly, to a battery module and a battery pack including a module housing with a simplified assembling process and an improved energy density.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery exterior, hermetically containing the electrode assembly together with an electrolyte.

In recent years, secondary batteries have been widely used not only in small-sized devices such as portable electronic devices but also in medium-sized or large-sized devices such as vehicles and power storage devices. When the secondary batteries are used in the middle-sized or large-sized devices, a large number of secondary batteries are electrically connected to increase capacity and power. In particular, secondary batteries are widely used for the middle-sized or large-sized devices since they may be easily stacked.

Meanwhile, recently, as the need for a large-capacity structure increases along with the utilization as an energy storage source, the demand for a battery pack in which a plurality of battery modules, each having a plurality of secondary batteries electrically connected in series and/or in parallel, increases.

In addition, the conventional battery module generally includes a plurality of cartridges made of plastic in order to protect or fix a plurality of secondary batteries included therein in a stacked form.

However, the cartridge made of plastic has low mechanical rigidity compared to a cartridge made of steel, so its internal components may be easily damaged when an external impact is applied to the battery module. Moreover, the battery module having a plurality of cartridges with low thermal conductivity has seriously low heat dissipation efficiency, which makes it difficult to cool the battery module.

Further, since the plurality of cartridges have many objects to be assembled, a lot of assembly time is required to manufacture a battery assembly, which may greatly increase the manufacturing cost. Moreover, the plurality of cartridges have a great volume, which lowers the energy density of the battery module.

DISCLOSURE

Technical Problem

The present disclosure is designed to solve the problems of the related art, and therefore the present disclosure is directed to providing a battery module and a battery pack including a module housing with a simplified assembling process and an improved energy density.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a battery assembly configured to include a plurality of secondary batteries and have a front side, a rear side, an upper side, a lower side, a left side and a right side; and a module housing including a first frame located at the left side of the battery assembly and having a plate shape with opposing ends bent rightward so that bent portions of the opposing ends of the first frame are respectively located at the upper side and the lower side of the battery assembly to surround at least a portion of each of the upper side and the lower side of the battery assembly, and a second frame located at the right side of the battery assembly and having a plate shape with opposing ends bent leftward so that bent portions of the opposing ends of the second frame are respectively located at the upper side and the lower side of the battery assembly to surround at least a portion of each of the upper side and the lower side of the battery assembly and are coupled with the bent portions of the first frame, respectively.

Moreover, ends of the bent portions of the first frame may be overlapped with ends of the bent portions of the second frame, respectively.

In addition, a male-female coupling unit having a male-female coupling structure may be respectively provided to the overlapped ends of the bent portions of the first frame and the second frame to restrict movement of the first frame and the second frame relative to each other.

Further, a welding coupling unit may be respectively provided to the overlapped ends of the bent portions of the first frame and the second frame so that the first frame and the second frame are coupled to each other by welding.

Also, a fixing clip may be added to the male-female coupling unit so as to be fitted into the male-female coupling structure.

Moreover, the male-female coupling unit may have a fixing hole perforated in the male-female coupling structure of the first frame and the second frame, and a fixing bolt inserted through the fixing hole.

In addition, at least one of the first frame and the second frame may have a guide protrusion formed at an inner surface thereof facing the battery assembly in an inwardly protruding form to press one side of the plurality of secondary batteries.

Further, a thermal conductive adhesive may be added to an inner surface of at least one of the first frame and the second frame so as to be bonded and fixed to the plurality of secondary batteries.

Also, an inner wall may be formed at an inner side of the first frame or the second frame to extend from an inner upper portion to an inner lower portion thereof.

In another aspect of the present disclosure, there is also provided a battery pack, comprising two or more of the battery modules according to the present disclosure.

In another aspect of the present disclosure, there is also provided a vehicle, comprising the battery pack according to the present disclosure.

Advantageous Effects

According to an embodiment of the present disclosure, since the male-female coupling unit having the male-female coupling structure of a fitting manner to restrict movement of the first frame and the second frame relative to each other is provided, the first frame and the second frame may be simply fastened to press to each other by moving inward with each other. Accordingly, the manufacturing method of the battery module may be simplified, thereby greatly increasing the manufacturing efficiency.

Moreover, unlike the prior art, the battery module of the present disclosure may shorten the time required for the manufacturing process and increase the energy density of the battery module by omitting the use of a cartridge.

Also, according to an embodiment of the present disclosure, since the welding guide line helps the welding process of a worker and also allows the welding coupling unit to be formed more quickly at a portion of the module housing with a relatively smaller thickness, the time required for the manufacturing process may be shortened effectively. Moreover, since the welding coupling unit is formed separately in addition to the male-female coupling structure, the coupling force between the first frame and the second frame may be further enhanced.

In addition, according to an embodiment of the present disclosure, since the fixing clip having the close fixing portion and the insert portion is separately added to the male-female coupling unit, it is possible to restrict movement of the male-female coupling structure of the male-female coupling unit in the front and rear direction and in the left and right direction, thereby effectively preventing the male-female coupling structure from being separated. Accordingly, the coupling of the male-female coupling structure of the male-female coupling unit may be more tightly maintained.

Moreover, according to an embodiment of the present disclosure, since the male-female coupling unit has the fixing hole and the fixing bolt, the movement of the male-female coupling structure of the male-female coupling unit in the vertical direction and in the horizontal direction may be restricted more strongly, thereby effectively preventing the male-female coupling structure from being separated.

In addition, according to an embodiment of the present disclosure, since the guide protrusions are formed on the inner surface of at least one of the first frame and the second frame, the stacked arrangement of the plurality of secondary batteries of the battery assembly may be effectively maintained. Accordingly, it is possible to effectively prevent the secondary batteries from being damaged due to an impact generated during the movement of the battery module.

Further, according to an embodiment of the present disclosure, since the inner wall is formed at the inner side of the first frame or the second frame, the battery module of the present disclosure may prevent the first frame or the second frame from deforming in the vertical direction due to the expansion and contraction caused by charge and discharge of the battery assembly.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
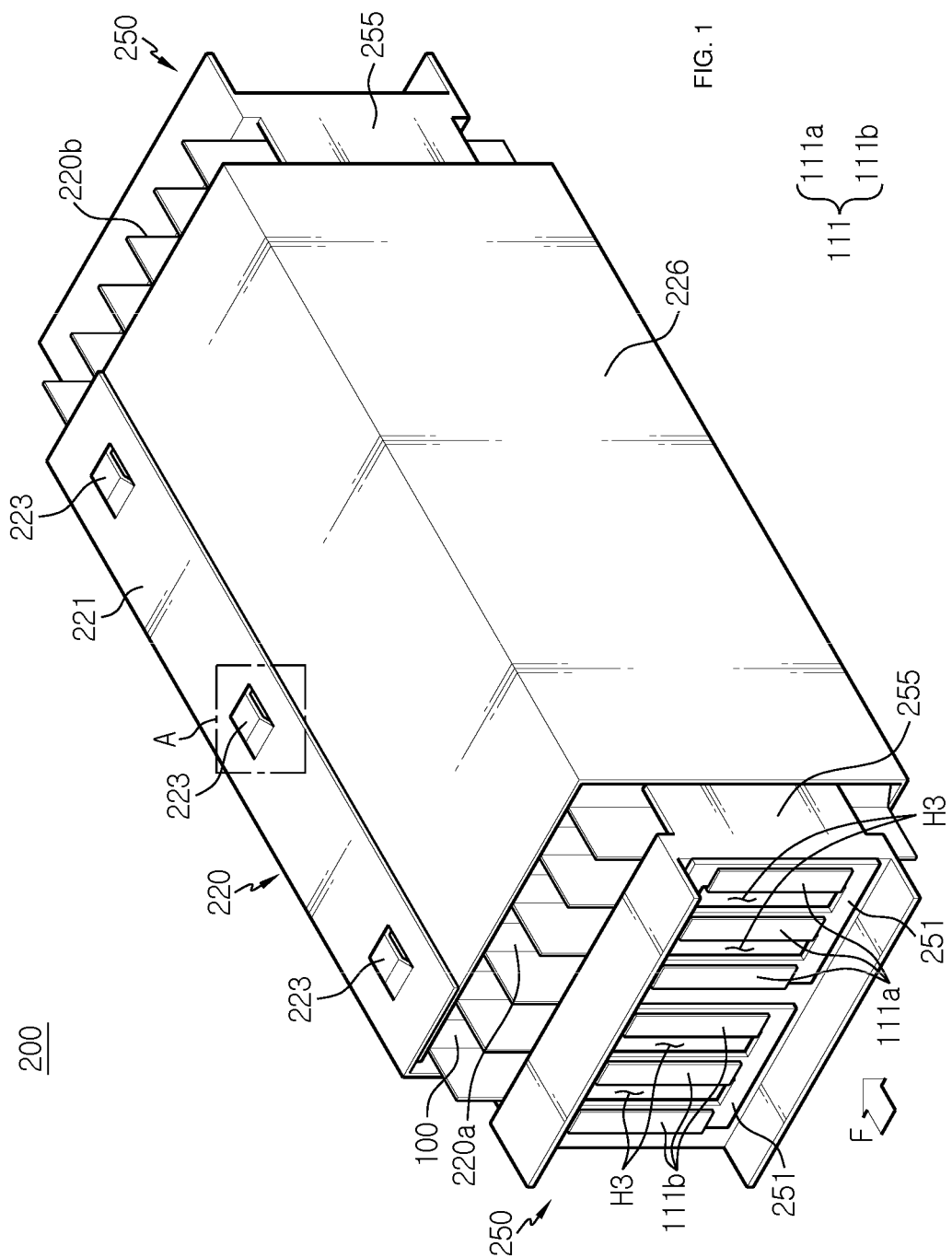
FIG. 1 is a perspective view schematically showing a battery module according to an embodiment of the present disclosure.
Figure 2:
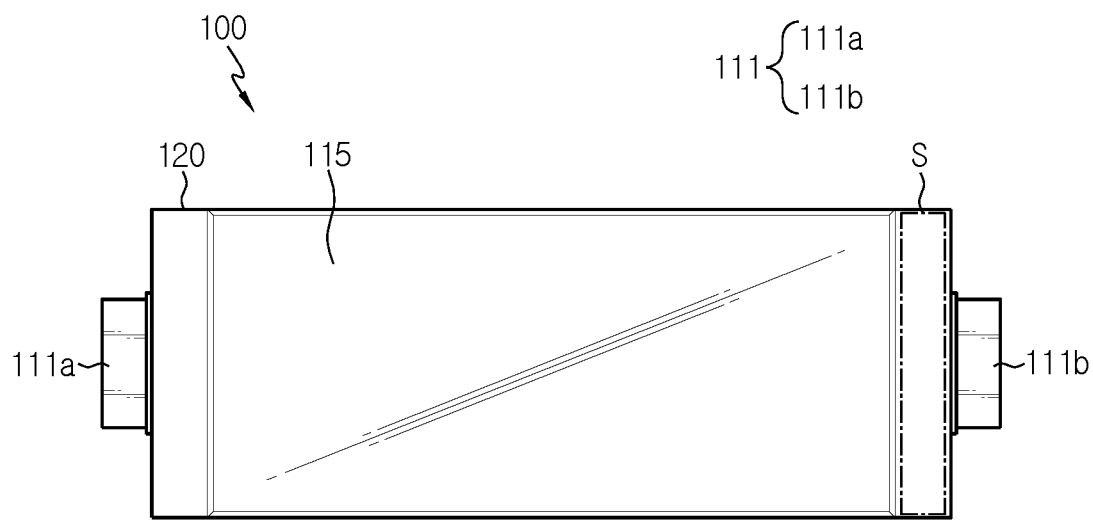
FIG. 2 is a side view schematically showing a pouch-type secondary battery, employed at the battery module according to an embodiment of the present disclosure.

FIG. 1 is a perspective view schematically showing a battery module according to an embodiment of the present disclosure. FIG. 2 is a side view schematically showing a pouch-type secondary battery, employed at the battery module according to an embodiment of the present disclosure. Also, FIG. 3 is a front view schematically showing some components of the battery module according to an embodiment of the present disclosure in a separated state.

Figure 3:
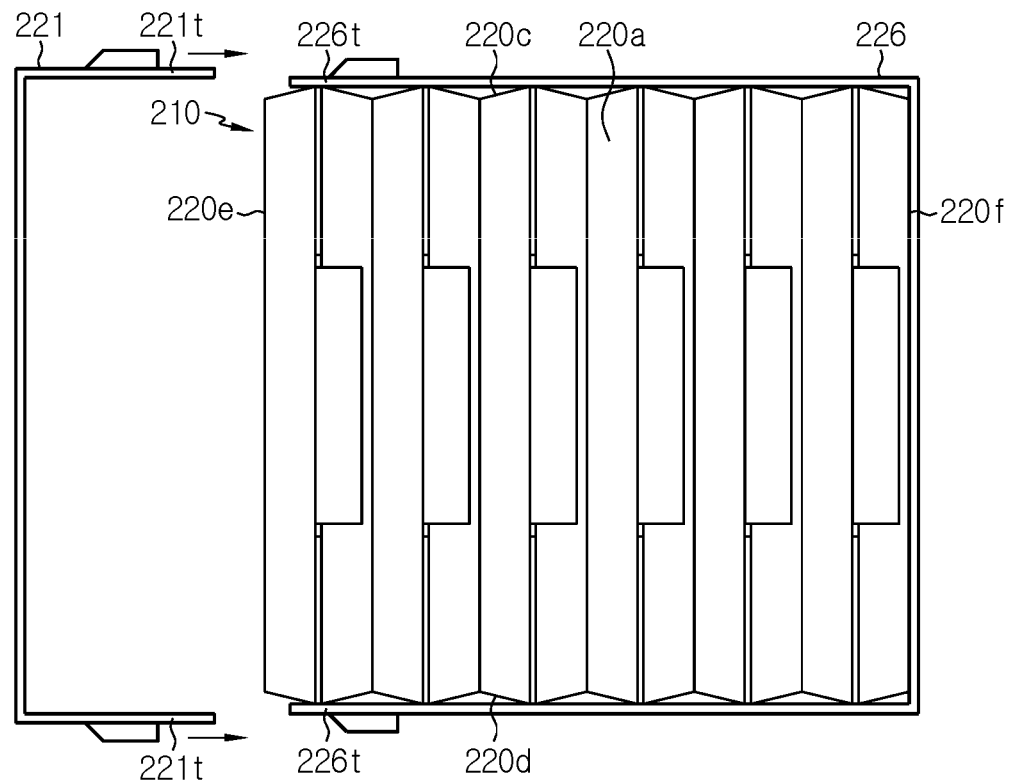
FIG. 3 is a front view schematically showing some components of the battery module according to an embodiment of the present disclosure in a separated state.

Referring to FIGS. 1 to 3, a battery module 200 according to an embodiment of the present disclosure may include a battery assembly 210, a module housing 220, and a bus bar assembly 250.

Specifically, the battery assembly 210 may include a plurality of secondary batteries having electrode leads 111. Here, the secondary battery 100 may be a pouch-type secondary battery 100. In particular, the pouch-type secondary battery 100 may include an electrode assembly (not shown), an electrolyte (not shown), and a pouch 120.

Here, the pouch 120 may include two pouches, namely a left pouch and a right pouch, at which an accommodation portion 115 having a concave form is formed. In addition, the electrode assembly and the electrolyte may be accommodated in the accommodation portion 115. Also, each of the two pouches includes an outer insulating layer, a metal layer, and an inner adhesive layer, and the inner adhesive layers of the two pouches may be bonded to each other at edge portions of the pouch 120 to form a sealing portion. Further, a terrace portion S may be formed at each of both ends of the pouch 120 at which a positive electrode lead 111a and a negative electrode lead 111b are formed.

In addition, the electrode assembly (not shown) is an assembly of an electrode and a separator, and may be configured such that at least one positive electrode plate and at least one negative electrode plate are disposed with the separator interposed therebetween. Also, a positive electrode tab is provided to a positive electrode plate of the electrode assembly, and at least one positive electrode tab may be connected to the positive electrode lead 111a.

Here, the positive electrode lead 111a has one end connected to the positive electrode tab and the other end exposed out of the pouch 120, and the exposed portion may serve as an electrode terminal of the secondary battery 100, for example a positive electrode terminal of the secondary battery 100.

In addition, a negative electrode tab is provided to a negative electrode plate of the electrode assembly, and at least one negative electrode tab may be connected to the negative electrode lead 111b. Also, the negative electrode lead 111b has one end connected to the negative electrode tab and the other end exposed out of the pouch, and the exposed portion may serve as an electrode terminal of the secondary battery 100, for example a negative electrode terminal of the secondary battery 100.

Moreover, the positive electrode lead 111a and the negative electrode lead 111b may be formed at both ends of the secondary battery 100 located at opposite sides relative to the center thereof. That is, the positive electrode lead 111a may be provided at one end based on the center of the secondary battery 100. In addition, the negative electrode lead 111b may be provided at the other end of the secondary battery 100 based on the center thereof. For example, as shown in FIGS. 1 and 2, each secondary battery 100 may be configured such that the positive electrode lead 111a and the negative electrode lead 111b protrude forward and backward, respectively.

Thus, according to this configuration of the present disclosure, in one secondary battery 100, there is no interference between the positive electrode lead 111a and the negative electrode lead 111b, and thus the area of the electrode leads 111 may be increased.

In addition, the positive electrode lead 111a and the negative electrode lead 111b may be configured in a plate shape. In particular, the positive electrode lead 111a and the negative electrode lead 111b may protrude in a horizontal direction in a standing-up form where wide surfaces thereof are oriented to the left and to the right, respectively. Here, the horizontal direction refers to a direction parallel to the ground when the battery module 200 is placed on the ground.

At this time, when viewed in the F direction (shown in FIG. 1), each pouch-type secondary battery 100 may be arranged to stand up approximately perpendicular to the ground such that two wide surfaces are located at the left and right sides and the sealing portions are located at the upper and lower sides and the front and rear sides thereof. In other words, each secondary battery 100 may be configured to be erect vertically. In addition, in this specification, the upper, lower, front, rear, left and right directions will be set based on the case when being observed in the F direction, unless specially stated otherwise.

However, the battery module 200 according to the present disclosure may employ various kinds of secondary batteries known at the time of filing of this application, without being limited to the pouch-type secondary battery 100 described above.

Meanwhile, when viewed in the F direction, the battery assembly 210 may have a front side 220a, a rear side 220b, an upper side 220c, a lower side 220d, a left side 220e, and a right side 220f.

Specifically, the electrode leads 111 protruding forward and rearward may be formed at the front side 220a and the rear side 220b of the battery assembly 210. In addition, the sealing portions of the plurality of secondary batteries 100 may be located at the upper side 220c, the lower side 220d, the front side 220a and the rear side 220b of the battery assembly 210.

In addition, the battery assembly 210 may be arranged such that the plurality of secondary batteries 100 are stacked in one direction (a left and right direction). For example, as shown in FIG. 1, the battery assembly 210 may be configured such that the plurality of pouch-type secondary batteries 100 are stacked in parallel to each other in the left and right direction.

Figure 4:
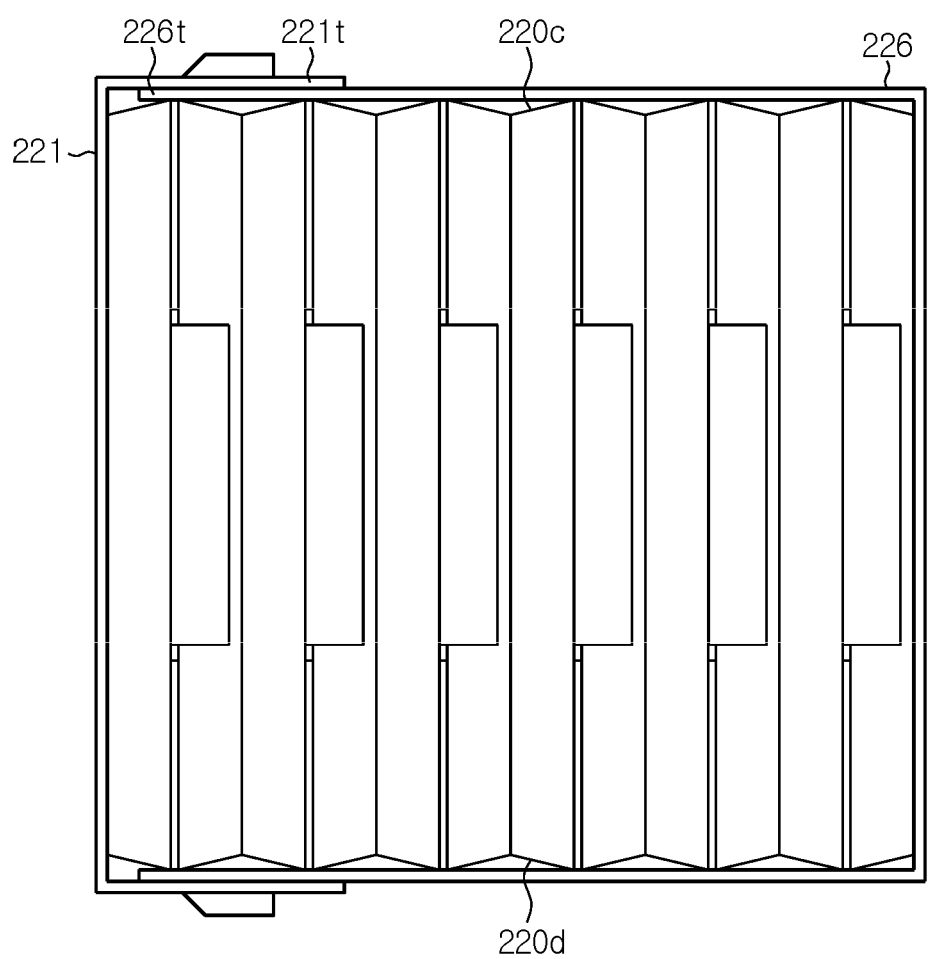
FIG. 4 is a front view schematically showing some components of the battery module according to an embodiment of the present disclosure.

FIG. 4 is a front view schematically showing some components of the battery module according to an embodiment of the present disclosure.

Referring to FIG. 4 along with FIGS. 1 and 3, the module housing 220 may include a first frame 221 and a second frame 226. Here, FIGS. 3 and 4 show the process of coupling the first frame 221 and the second frame 226 of the module housing 220. In this case, the first frame 221 and the second frame 226 may include a steel material or stainless steel plated with an electrically insulating material. That is, since the steel or stainless material is excellent in thermal conductivity, it is possible to effectively release the heat generated from the battery assembly 210. Further, since the steel or stainless steel material has excellent mechanical rigidity, it is possible to effectively prevent the battery module 200 from being damaged due to an external impact.

Specifically, the first frame 221 may have a plate shape whose one surface is relatively wider than a side surface. Also, when viewed in the F direction, the first frame 221 may be located at the left side of the battery assembly 210. Moreover, in the first frame 221, both ends of the plate may be bent rightward to form bent portions 221t. In addition, the bent portions 221t may be located at the upper side 220c and the lower side 220d of the battery assembly 210, respectively.

For example, as shown in FIG. 1, the first frame 221 may have a plate shape whose both ends are bent to the right. In addition, a left side of the first frame 221 may be located to closely contact the left side 220e of the battery assembly 210. Further, the bent portions 221t at both ends of the first frame 221 may be located to surround at least a portion of the upper side 220c and the lower side 220d of the battery assembly 210, respectively.

Specifically, the second frame 226 may have a plate shape with one surface relatively wider than a side surface. In addition, a right side of the second frame 226 may be located at the right side of the battery assembly 210. Moreover, in the second frame 226, both ends of the plate may be bent to the left to form bent portions 226t. In addition, the bent portions 226t may be located at the upper side 220c and the lower side 220d of the battery assembly 210, respectively. Also, the bent portions 226t of the second frame 226 may be coupled with the bent portions 221t of the first frame 221.

For example, as shown in FIG. 4, the second frame 226 may have a plate shape whose both ends are bent leftward. Also, the second frame 226 may be located to closely contact the right side 220f of the battery assembly 210. Further, the bent portions 226t at both ends of the second frame 226 may be located to surround at least a portion of the upper side 220c and the lower side 220d of the battery assembly 210, respectively.

Also, the module housing 220 may be configured such that ends of the bent portions 221t of the first frame 221 are overlapped with ends of the bent portions 226t of the second frame 226. For example, as shown in FIG. 4, both ends of the first frame 221 and the second frame 226 may be overlapped with each other such that the bent portions 221t of the first frame 221 surround the outer sides of the bent portions 226t of the second frame 226.

In addition, referring to FIGS. 3 and 4, both ends (the bent portions) 221t, 226t of the first frame 221 and the second frame 226 may have different vertical widths from each other. For example, as shown in FIGS. 3 and 4, the vertical width between both ends of the first frame 221 may be greater than the vertical width between both ends of the second frame 226.

Thus, according to this configuration of the present disclosure, since the first frame 221 and the second frame 226 are formed such that both ends 221t, 226t thereof have different vertical widths from each other, both ends 221t, 226t of the first frame 221 and the second frame 226 may be overlapped and fastened to each other while pressing each other.

Moreover, unlike the prior art, the battery module 200 of the present disclosure may shorten the time required for the manufacturing process and increase the energy density of the battery module 200 by omitting the use of a cartridge.

In addition, the first frame 221 and the second frame 226 may be configured to press the left surface 210e and the right surface 210f of the battery assembly 210 in an inner direction while being coupled to each other. Here, the 'inner direction' refers to a direction toward the inner center of the body of the battery assembly 210.

For example, as shown in FIG. 4, the left side of the plate shape of the first frame 221 and the right side of the second frame 226 may be configured to press the left surface 210e and the right surface 210f of the battery assembly 210 inward.

Accordingly, according to this configuration of the present disclosure, since the battery module 200 of the present disclosure includes the first frame 221 and the second frame 226 to prevent the battery assembly 210 from expanding due to charge and discharge, it is possible to reduce side reactions generated during charging and discharging of the battery assembly 210.

Figure 5:
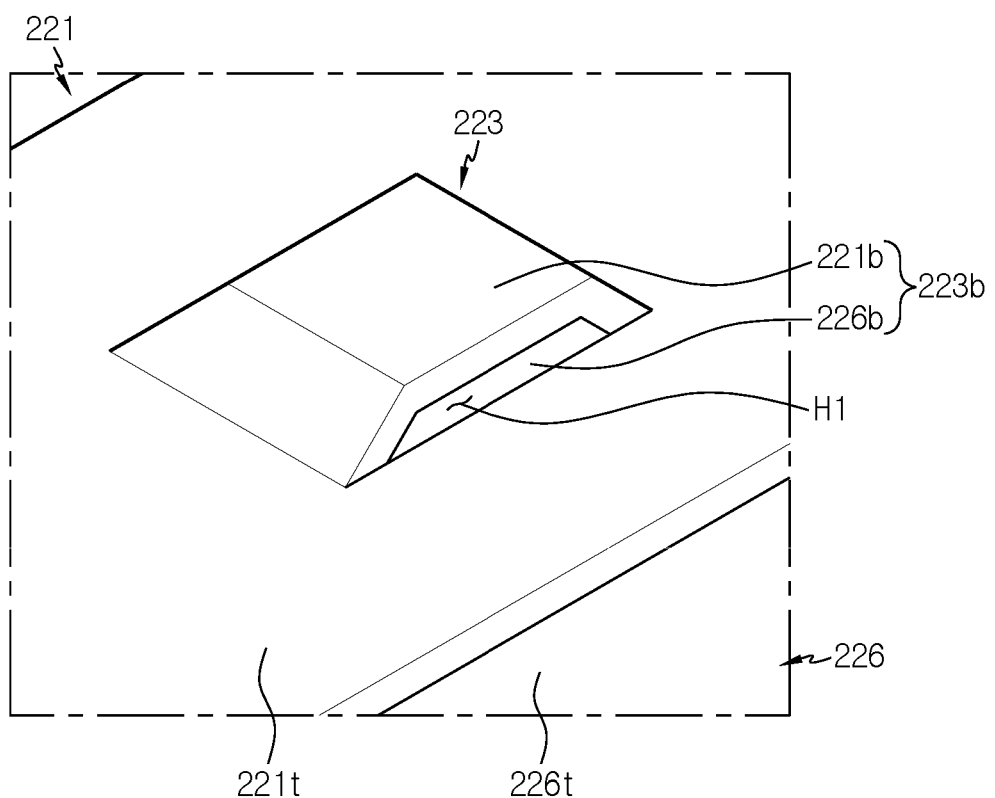
FIG. 5 is a partial perspective view schematically showing a portion A of the battery module of FIG. 1.

FIG. 5 is a partial perspective view schematically showing a portion A of the battery module of FIG. 1.

Referring to FIG. 5 along with FIG. 4, a male-female coupling unit 223 may be provided to an overlapped portion of the first frame 221 and the second frame 226. Specifically, the male-female coupling unit 223 may have a male-female coupling structure 223b that restricts movement of the first frame 221 and the second frame 226. For example, a first convex structure 221b protruding outward may be formed at the bent portion of the first frame 221 by pressing. In addition, the first convex structure 221b may have an opening H1 formed at one side thereof to be open in one direction.

For example, as shown in FIG. 1, three first convex structures 221b protruding outward may be formed at the bent portion of the first frame 221. Further, the first convex structure 221b may have openings H1 formed at the right side to be open in the right direction.

For example, a second convex structure 226b protruding outward may be formed at the bent portion 226t of the second frame 226. In addition, the second convex structure 226b may be formed to have a size similar (identical) to or slightly greater than the size of the inner surface of the first convex structure 221b. Further, the second convex structure 226b may have a shape whose an upper portion is inserted into the opening H1 of the first convex structure 221b.

For example, as shown in FIGS. 1 and 5, three second convex structures 226b protruding outward may be formed at the bent portion 226t of the second frame 226. Further, the second convex structure 226b may be formed similar (identical) to or slightly greater than the size of the inner surface of the first convex structure 221b so as to be inserted into the first convex structure 221b.

Further, the first convex structure 221b and the second convex structure 226b may be coupled to each other to form the male-female coupling structure 223b.

Thus, according to this configuration of the present disclosure, since the male-female coupling unit 223 having the male-female coupling structure 223b of a fitting manner to restrict movement of the first frame 221 and the second frame 226 relative to each other is provided, the first frame 221 and the second frame 226 may be simply fastened to press to each other by moving inward with each other. Accordingly, the manufacturing method of the battery module 200 may be simplified, thereby greatly increasing the manufacturing efficiency.

Figure 6:
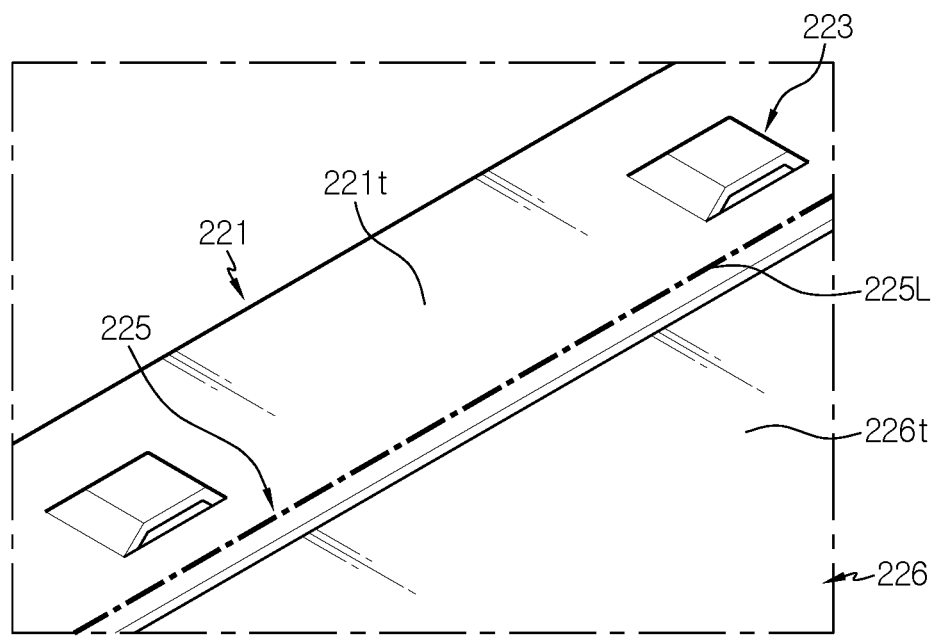
FIG. 6 is a partial perspective view schematically showing a portion of a first frame and a second frame of a battery module according to another embodiment of the present disclosure.

FIG. 6 is a partial perspective view schematically showing a portion of a first frame and a second frame of a battery module according to another embodiment of the present disclosure.

Referring to FIG. 6, a welding coupling unit 225 may be provided to the overlapped portion of the first frame 221 and the second frame 226 where that the first frame 221 and the second frame 226 are coupled to each other by welding.

For example, a welding guide line 225L may be formed at the welding coupling unit 225 for efficiently performing the welding process. Here, the welding guide line 225L may have a shape in which the bent portions 221t, 226t of the first frame 221 and the second frame 226 of the module housing 220 extend linearly and continuously with a smaller thickness than that of the remaining portion.

Thus, according to this configuration of the present disclosure, since the welding guide line 225L helps the welding process of a worker and also allows the welding coupling unit 225 to be formed more quickly at a portion of the module housing 220 with a relatively smaller thickness, the time required for the manufacturing process may be shortened effectively.

Figure 7:
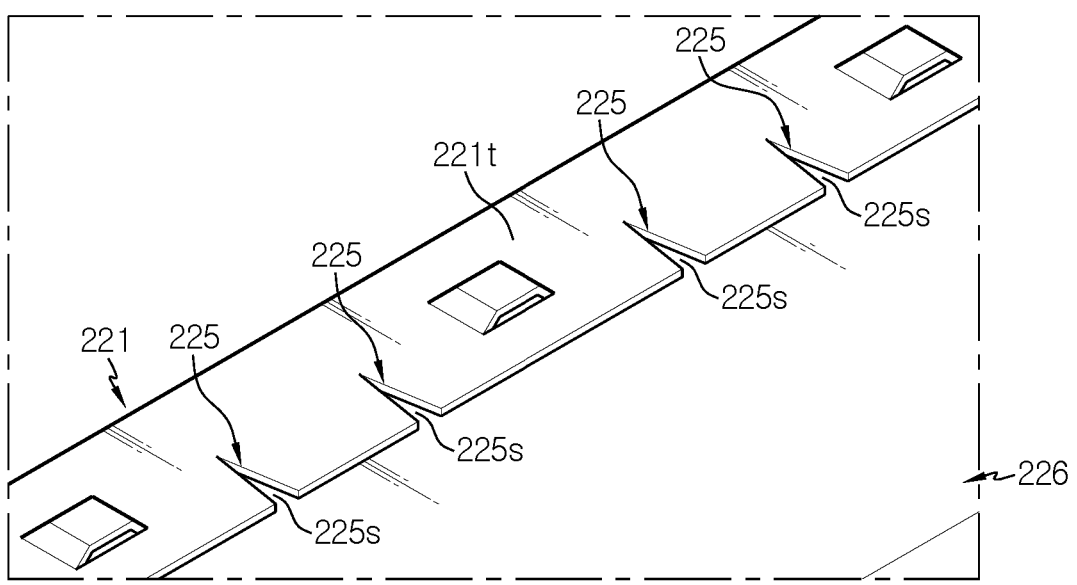
FIG. 7 is a partial perspective view schematically showing a portion of a first frame and a second frame of a battery module according to still another embodiment of the present disclosure.

FIG. 7 is a partial perspective view schematically showing a portion of a first frame and a second frame of a battery module according to still another embodiment of the present disclosure.

Referring to FIG. 7, the welding coupling unit 225 may have a plurality of slits 225s. In addition, the slit 225s may extend in an inner direction (a left direction) from an outer circumference of the first frame 221. For example, as shown in FIG. 7, four slits 225s extending leftward from the outer circumference may be formed at the bent portion 221t of the first frame 221.

Thus, according to this configuration of the present disclosure, when resistance welding is performed to the bent portions 221t of the first frame 221 and the second frame 226 overlapped with each other, an applied current may be focused on the welding site by the slits 225s formed at the first frame 221, thereby effectively shortening the time of the welding process and increasing the bonding reliability.

Figure 8:
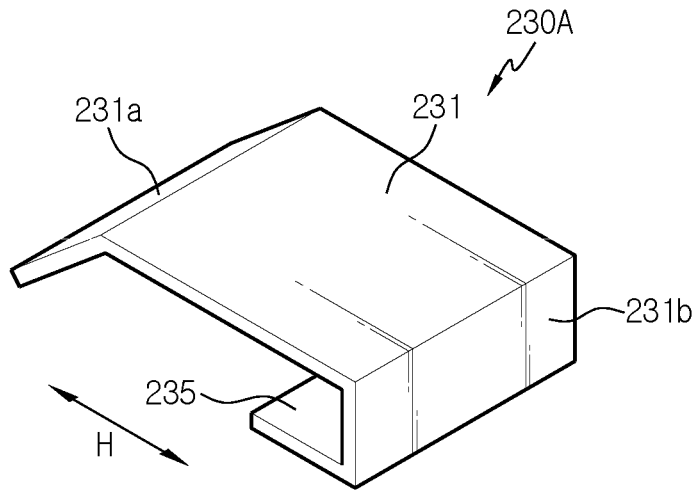
FIG. 8 is a partial perspective view schematically showing a fixing clip, employed at a battery module according to still another embodiment of the present disclosure.

FIG. 8 is a partial perspective view schematically showing a fixing clip, employed at a battery module according to still another embodiment of the present disclosure. Also, FIG. 9 is a partial perspective view schematically showing the battery module according to still another embodiment of the present disclosure.

Figure 9:
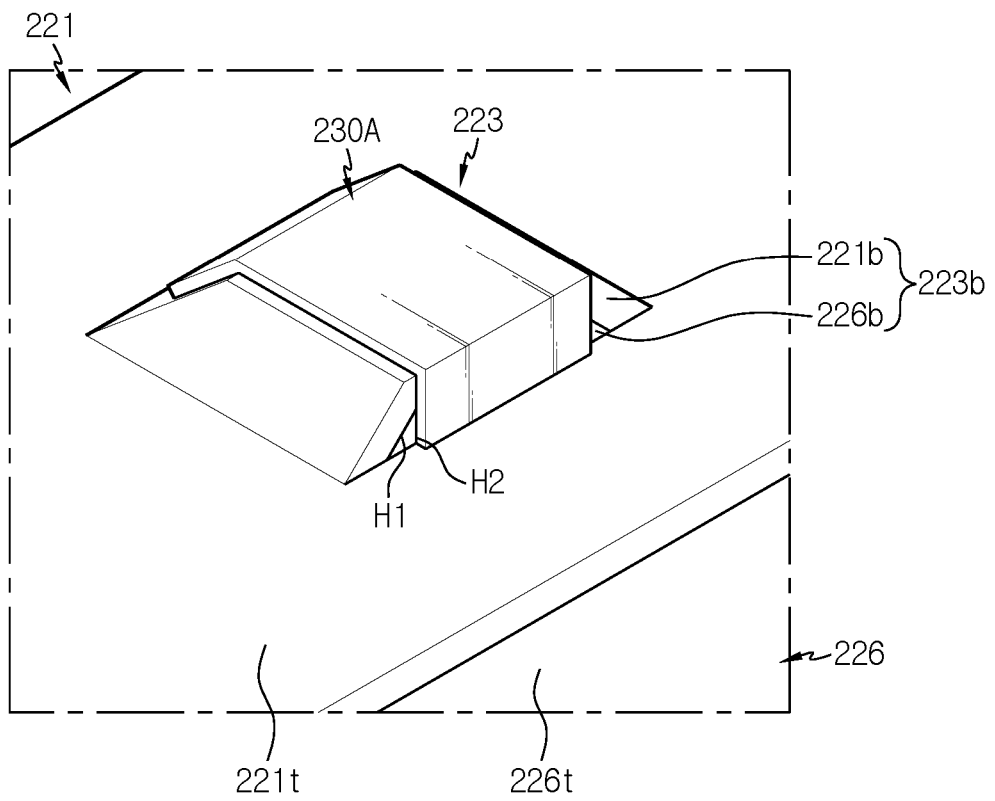
FIG. 9 is a partial perspective view schematically showing a battery module according to still another embodiment of the present disclosure.

Referring to FIGS. 8 and 9, a fixing clip 230A may be added to the male-female coupling unit 223. Specifically, the fixing clip 230A may have a close fixing portion 231 formed to surround an outer surface of the male-female coupling structure 223b at which the first convex structure 221b and the second convex structure 226b are coupled. More specifically, the close fixing portion 231 may have a plate shape extending in the horizontal direction to cover an upper portion of the first convex structure 221b of the first frame 221. In addition, the close fixing portion 231 may have a first bent structure 231a and a second bent structure 231b.

For example, when viewed in the F direction, the first bent structure 231a may be formed at one side of the fixing clip 230A and have a shape bent inward to surround the left surface of the first convex structure 221b provided to the male-female coupling unit 223 of the first frame 221. In addition, the second bent structure 231b may be formed at the other side of the fixing clip 230A and have a shape bent inward to surround the right surface of the first convex structure 221b provided to the male-female coupling unit 223 of the second frame 226.

Thus, according to this configuration of the present disclosure, since the fixing clip 230A having the close fixing portion 231 is separately added to the male-female coupling unit 223, it is possible to restrict movement of the male-female coupling structure 223b of the male-female coupling unit 223 in the front and rear direction, thereby effectively preventing the male-female coupling structure 223b from being separated. Accordingly, the coupling of the male-female coupling structure 223b of the male-female coupling unit 223 may be more tightly maintained.

Meanwhile, referring to FIGS. 8 and 9, the fixing clip 230A may have an insert portion 235 bent in the horizontal direction H and formed at the bent end of the second bent structure 231b of the close fixing portion 231 such that a portion thereof is fitted into the male-female coupling structure 223b. Further, the insert portion 235 may be configured to be inserted into an opening H2 formed in the second convex structure 226b of the second frame 226, which is located inside the opening H1 formed in the first convex structure 221b of the first frame 221.

For example, as shown in FIG. 9, the insert portion 235 may have a portion bent leftward from the end of the second bent structure 231b of the close fixing portion 231 so as to be inserted into the opening H2 of the second convex structure 226b disposed inside the opening H1 formed in the first convex structure 221b.

Thus, according to this configuration of the present disclosure, since the fixing clip 230A having the insert portion 235 is formed, it is possible to restrict the movement of the male-female coupling structure 223b of the male-female coupling unit 223 in the vertical direction, thereby effectively preventing the male-female coupling structure 223b from being separated. Accordingly, the coupling of the male-female coupling structure 223b of the male-female coupling unit 230 may be more firmly maintained. In addition, the fixing clip 230A may be completely installed in a simple way just by inserting, which ensures efficient installation.

Figure 10:
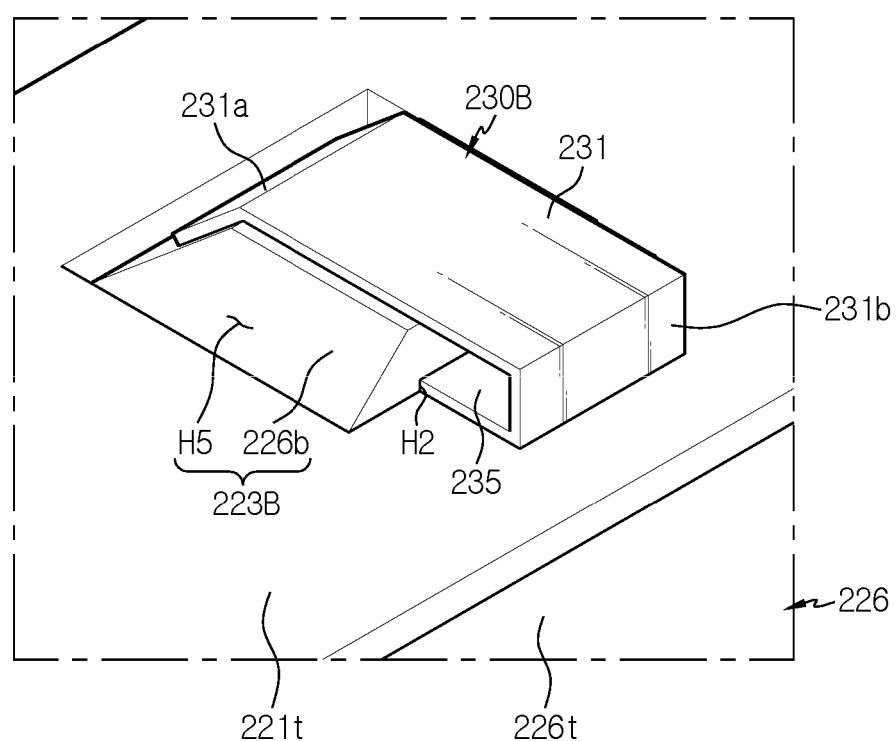
FIG. 10 is a partial perspective view schematically showing a battery module according to still another embodiment of the present disclosure.

FIG. 10 is a partial perspective view schematically showing a battery module according to still another embodiment of the present disclosure.

Referring to FIG. 10, unlike the male-female coupling unit 223 of FIG. 5, the male-female coupling unit 223B of FIG. 10 does not have the first convex structure 221b formed at the bent portion 221t of the first frame 221, and an open portion H5 perforated in the vertical direction may be formed instead. That is, the upper portion of the second convex structure 226b of the second frame 226 may be inserted into the open portion H5 of the first frame 221.

In addition, a fixing clip 230B may be added in a form different from the fixing clip 230A of FIG. 8 may be added to the male-female coupling unit 223 of FIG. 10. Compared with the fixing clip 230A of FIG. 8, the fixing clip 230B of FIG. 10 may have a shape in which the second bent structure 231*b* of the close fixing portion 231 extends a little further to one side. That is, the close fixing portion 231 of the fixing clip 230B may be formed such that a portion of the second bent structure 231*b* is located at the upper surface of the bent portion 221*t* of the first frame 221.

Further, the first bent structure 231*a* of the close fixing portion 231 may have a shape bent to surround the outer surface of the second convex structure 226*b* of the second frame 226.

For example, as shown in FIG. 10, the fixing clip 230B may be provided to the male-female coupling unit 223B such that a portion of the insert portion 235 is inserted and fixed into the opening H2 of the second convex structure 226*b* of the second frame 226. In addition, the close fixing portion 231 of the fixing clip 230B may be elongated in the left and right direction so that a portion of the second bent structure 231*b* is located at the upper surface of the bent portion 221*t* of the first frame 221.

Thus, according to this configuration of the present disclosure, since the male-female coupling unit 223 includes a different type of fixing clip 230B, it is possible to restrict movement of the male-female coupling structure 223*b* of the male-female coupling unit 223 in the vertical direction and in the lateral direction, thereby effectively preventing the male-female coupling structure 223*b* from being separated. Accordingly, the coupling of the male-female coupling structure 223*b* of the male-female coupling unit 223 may be more tightly maintained. In addition, the fixing clip 230B may be completely installed in a simple way by inserting, thereby ensuring efficient installation.

Figure 11:
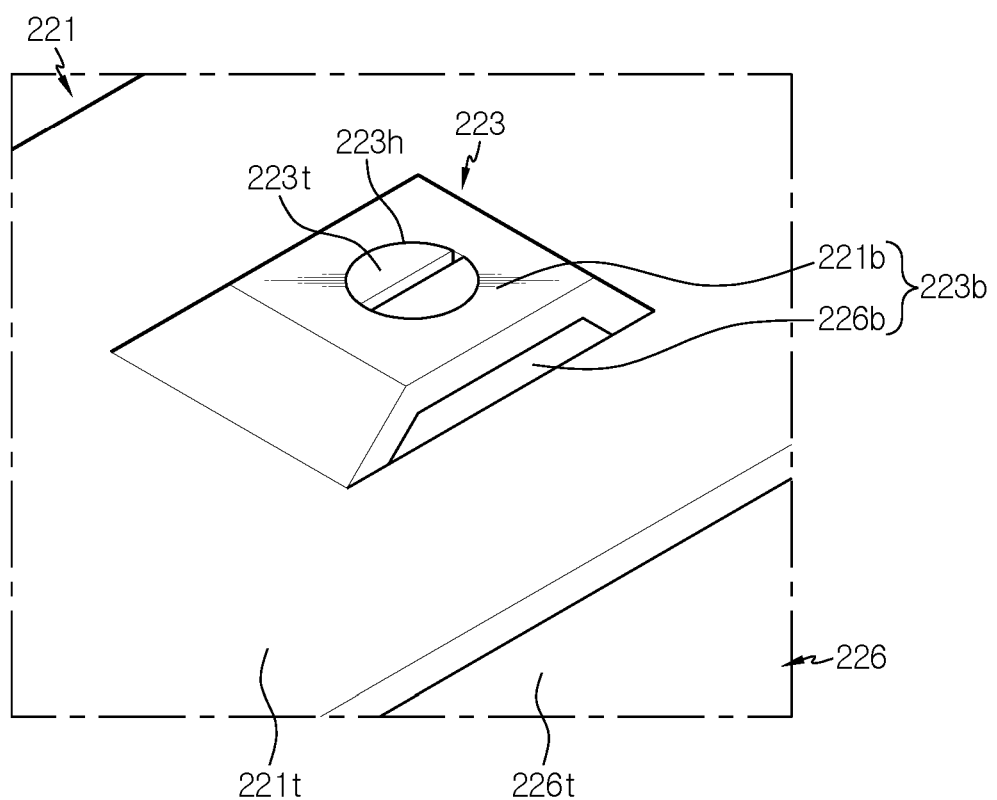
FIG. 11 is a partial perspective view schematically showing a battery module according to still another embodiment of the present disclosure.

FIG. 11 is a partial perspective view schematically showing a battery module according to still another embodiment of the present disclosure.

Referring to FIG. 11, similar to the male-female coupling unit 223 of FIG. 5, the first frame 221 and the second frame 226 of FIG. 11 may include another type of male-female coupling structure 223*b* to restrict the movement of the first frame 221 and the second frame 226. For example, a first convex structure 221*b* protruding outward may be formed at the bent portion 221*t* of the first frame 221. In addition, a second convex structure 226*b* protruding outward may be formed at the bent portion 226*t* of the second frame 226.

Moreover, compared with the male-female coupling unit 223 of FIG. 5, the male-female coupling unit 223 of FIG. 11 may further include a fixing hole 223*h* perforated in the male-female coupling structure 223*b* of the first frame 221 and the second frame 226, and a fixing bolt 223*t* inserted through the fixing hole 223*h*.

For example, as shown in FIG. 11, the fixing hole 223*h* perforated in the vertical direction may be formed in the first convex structure 221*b* and the second convex structure 226*b* of one male-female coupling unit 223, respectively. In addition, the fixing bolt 223*t* may be inserted into and fixed to the fixing hole 223*h*.

Thus, according to this configuration of the present disclosure, since the male-female coupling unit 223 has the fixing hole 223*h* and the fixing bolt 223*t*, the movement of the male-female coupling structure 223*b* of the male-female coupling unit 223 in the vertical direction and in the horizontal direction may be restricted more strongly, thereby effectively preventing the male-female coupling structure 223*b* from being separated.

Figure 12:
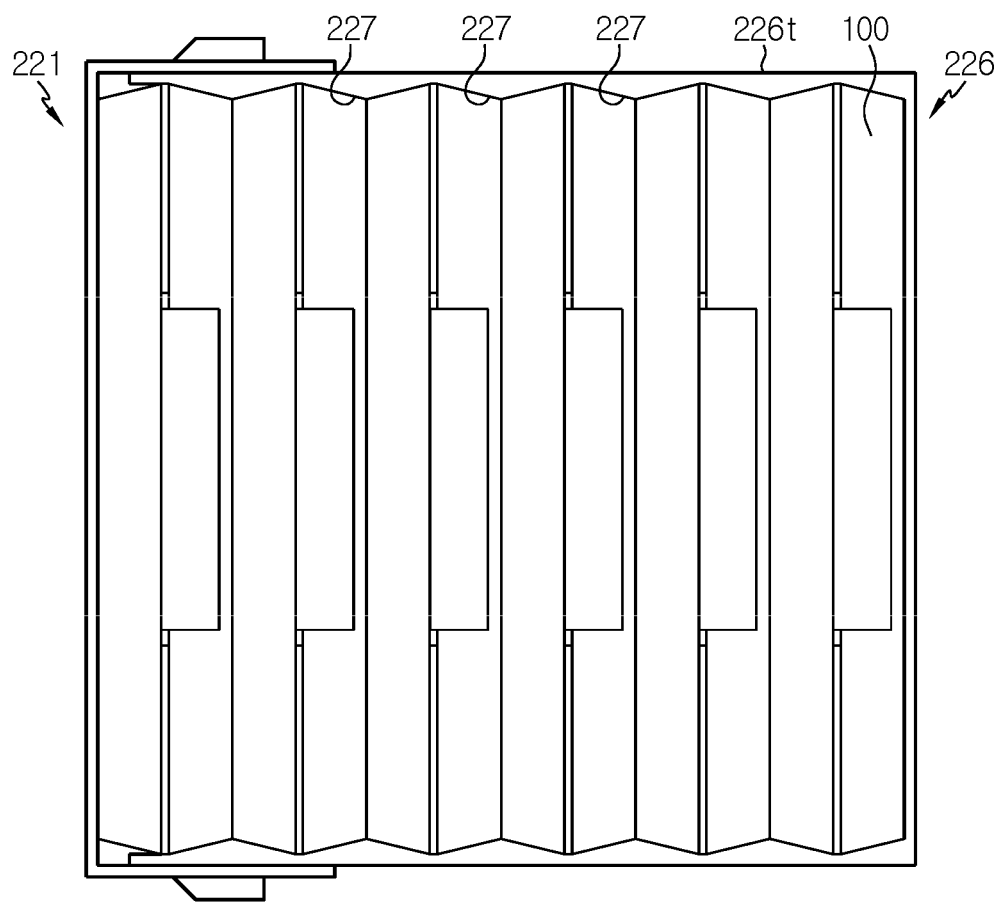
FIG. 12 is a front view schematically showing some components of a battery module according to another embodiment of the present disclosure.

FIG. 12 is a front view schematically showing some components of a battery module according to another embodiment of the present disclosure.

Referring to FIG. 12, at least one of the first frame 221 and the second frame 226 may have a guide protrusion 227 to effectively maintain the stacked arrangement of the plurality of secondary batteries 100. Specifically, the guide protrusion 227 may be formed at an inner surface thereof facing the battery assembly 210 to protrude inward so as to press one side of the plurality of secondary batteries 100.

For example, as shown in FIG. 12, a plurality of guide protrusions 227 may be formed an inner upper surface and an inner lower surface of the bent portion 226*t* of the second frame 226 of the module housing 220 to protrude inward so as to press one side (the upper side or the lower side) of the plurality of secondary batteries 100.

Thus, according to this configuration of the present disclosure, since the guide protrusions 227 is formed on the inner surface of at least one of the first frame 221 and the second frame 226, the stacked arrangement of the plurality of secondary batteries 100 of the battery assembly 210 may be effectively maintained. Accordingly, it is possible to effectively prevent the secondary batteries 100 from being damaged due to an impact generated during the movement of the battery module 200.

Figure 13:
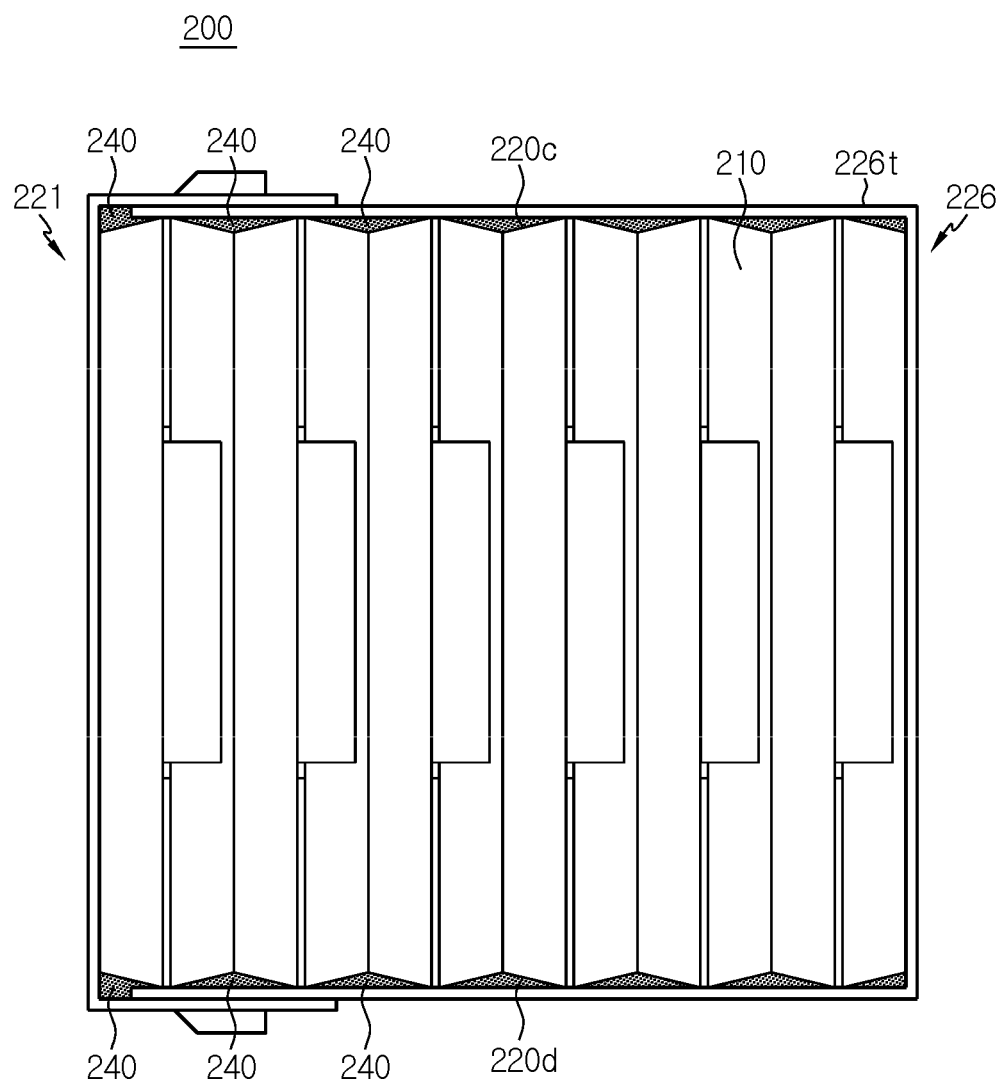
FIG. 13 is a front view schematically showing some components of a battery module according to still another embodiment of the present disclosure.

FIG. 13 is a front view schematically showing some components of a battery module according to still another embodiment of the present disclosure.

Referring to FIG. 13, a thermal conductive adhesive 240 may be added to the inner surface of at least one of the first frame 221 and the second frame 226 so as to be bonded fixed to the plurality of secondary batteries 100. Specifically, the thermal conductive adhesive 240 may be added to be bonded to the inner surface of at least one of the first frame 221 and the second frame 226 and at least one of the upper surface 220*c*, the lower surface 220*d*, the left surface 220*e* and the right surface 220*f* of the battery assembly 210.

For example, as shown in FIG. 13, the thermal conductive adhesive 240 may be added to the inner upper surface and the inner lower surface of the bent portion 226*t* of the second frame 226 such that there is no gap between the upper surface 220*c* and the lower surface 220*d* of the battery assembly 210.

Thus, according to this configuration of the present disclosure, since the thermal conductive adhesive 240 to the inner surface of at least one of the first frame 221 and the second frame 226, the gap between the battery assembly 210 and the first frame 221 and/or the second frame 226 may be filled, thereby preventing the heat radiation efficiency of the battery module 200 from decreasing due to air existing in the gap. Moreover, the thermal conductive adhesive 240 may also prevent the module housing 220 from deforming due to expansion and contraction caused by charge and discharge of the battery assembly 210.

Figure 14:
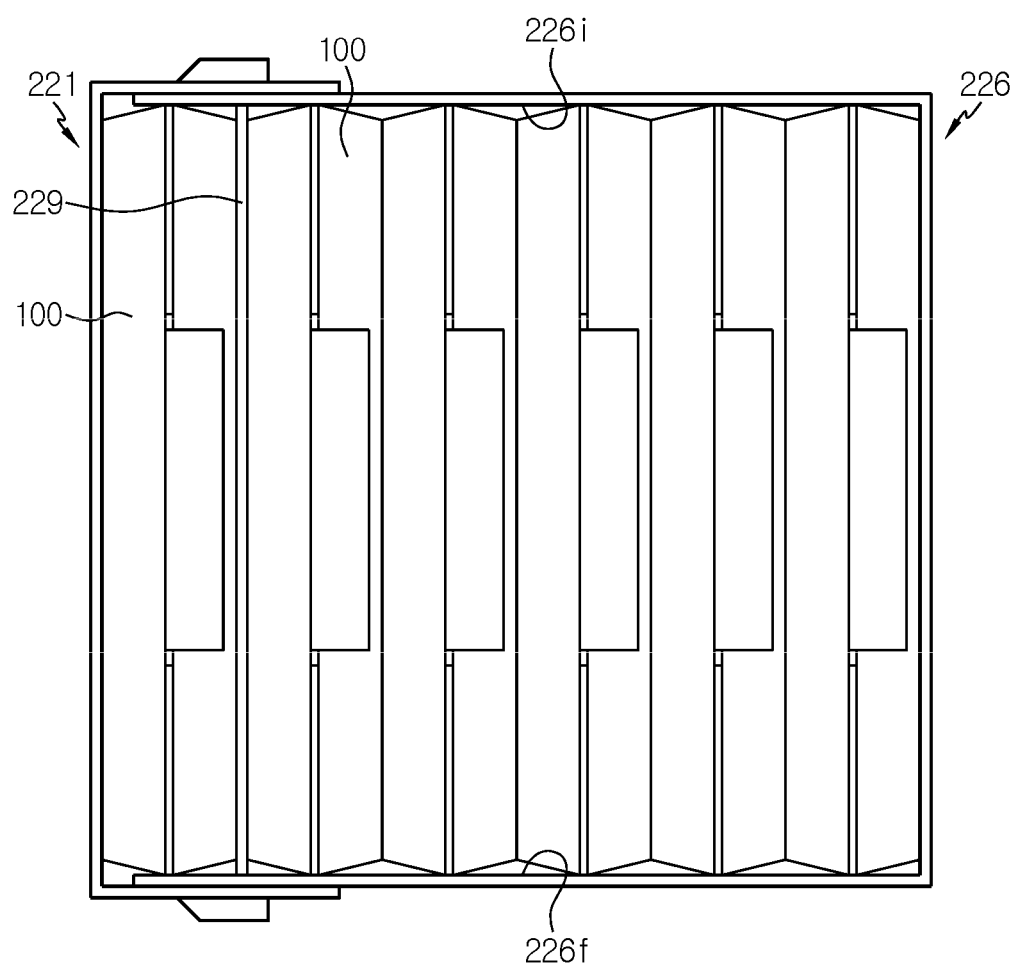
FIG. 14 is a front view schematically showing some components of a battery module according to still another embodiment of the present disclosure.

FIG. 14 is a front view schematically showing some components of a battery module according to still another embodiment of the present disclosure.

Referring to FIG. 14, an inner wall 229 extending from the inner upper portion to the inner lower portion may be formed inside the first frame 221 or the second frame 226. Specifically, the inner wall 229 may be formed as a portion of the first frame 221 or the second frame 226 extends. That is, the inner wall 229 may be made of the same material as the first frame 221 or the second frame 226 and may be formed integrally.

For example, as shown in FIG. 14, the inner wall 229 extending from an inner upper portion 226*i* to an inner lower portion 226*f* may be formed at the inner side of the second frame 226. In addition, the inner wall 229 may be located to be interposed between the plurality of secondary batteries 100.

Thus, according to this configuration of the present disclosure, since the inner wall 229 is formed at the inner side of the first frame 221 or the second frame 226, it is possible to prevent the first frame 221 or the second frame 226 from deforming in the vertical direction due to the expansion and contraction caused by charge and discharge of the battery assembly 210.

Meanwhile, referring to FIG. 1 again, the bus bar assembly 250 may include a bus bar plate 251 and a bus bar frame 255.

Here, the bus bar frame 255 may be configured such that the bus bar plate 251 is mounted and fixed to a front surface thereof. In addition, the bus bar frame 255 may position the bus bar plate 251 such that the electrode lead 111 of the battery assembly 210 and the bus bar plate 251 may contact each other at an appropriate location.

Specifically, the bus bar frame 255 may include an electrically insulating material. For example, the electrically insulating material may be plastic.

In addition, the bus bar frame 255 may be located between the front side of the body of the secondary battery 100 and the rear side of the bus bar plate 251. That is, the bus bar frame 255 may be configured such that a passing hole H3 through which the electrode lead 111 of the battery assembly 210 passes is formed therein or the electrode lead 111 protrudes forward to the front beyond the side portion of the bus bar frame 255. In addition, the ends of the positive electrode lead 111a and the negative electrode lead 111b may be bent in the left and right direction to contact the bus bar plate 251, respectively.

For example, as shown in FIG. 1, the battery module 200 includes two bus bar frames 255 located at a front side and a rear side, respectively. In addition, the bus bar frame 255 at the front side is located between the front side of the body of the secondary battery 100 of the battery assembly 210 and the rear side of the bus bar plate 251, and the bus bar plate 251 is mounted to the front surface thereof. Further, the bus bar frame 255 at the rear side is located between the rear side of the body of the secondary battery 100 of the battery assembly 210 and the front side of the bus bar plate (not shown), and the bus bar plate 251 is mounted to the rear side thereof.

Thus, according to this configuration of the present disclosure, since the bus bar frame 255 is made of an electrically insulating material, it is possible to prevent a short circuit from occurring between the bus bar plate 251 and the secondary battery 100. In addition, since the bus bar plate 251 is fixed to the front surface of the bus bar frame 255, it is easy to make an electrical connection between the bus bar plate 251 and the electrode lead 111.

Specifically, the bus bar plate 251 may be configured to contact two or more of the electrode leads 111 of the battery assembly 210. That is, the bus bar plate 251 may be configured to electrically connect two or more secondary batteries 100 to each other in parallel and/or in series.

In addition, the bus bar plate 251 may include an electrically conductive material. More specifically, the electrically conductive material may be a metal with high conductivity such as copper, aluminum, nickel and gold.

For example, as shown in FIG. 1, two bus bar plates 251 may be mounted to the outer side of each of the two bus bar frames 255. In addition, the four bus bar plates 251 may be configured to electrically connect six secondary batteries 100 in a complex way in parallel and in series. Specifically, as in FIG. 1, three positive electrode leads 111a or three negative electrode leads 111b may contact one bus bar plate 251.

Figure 15:
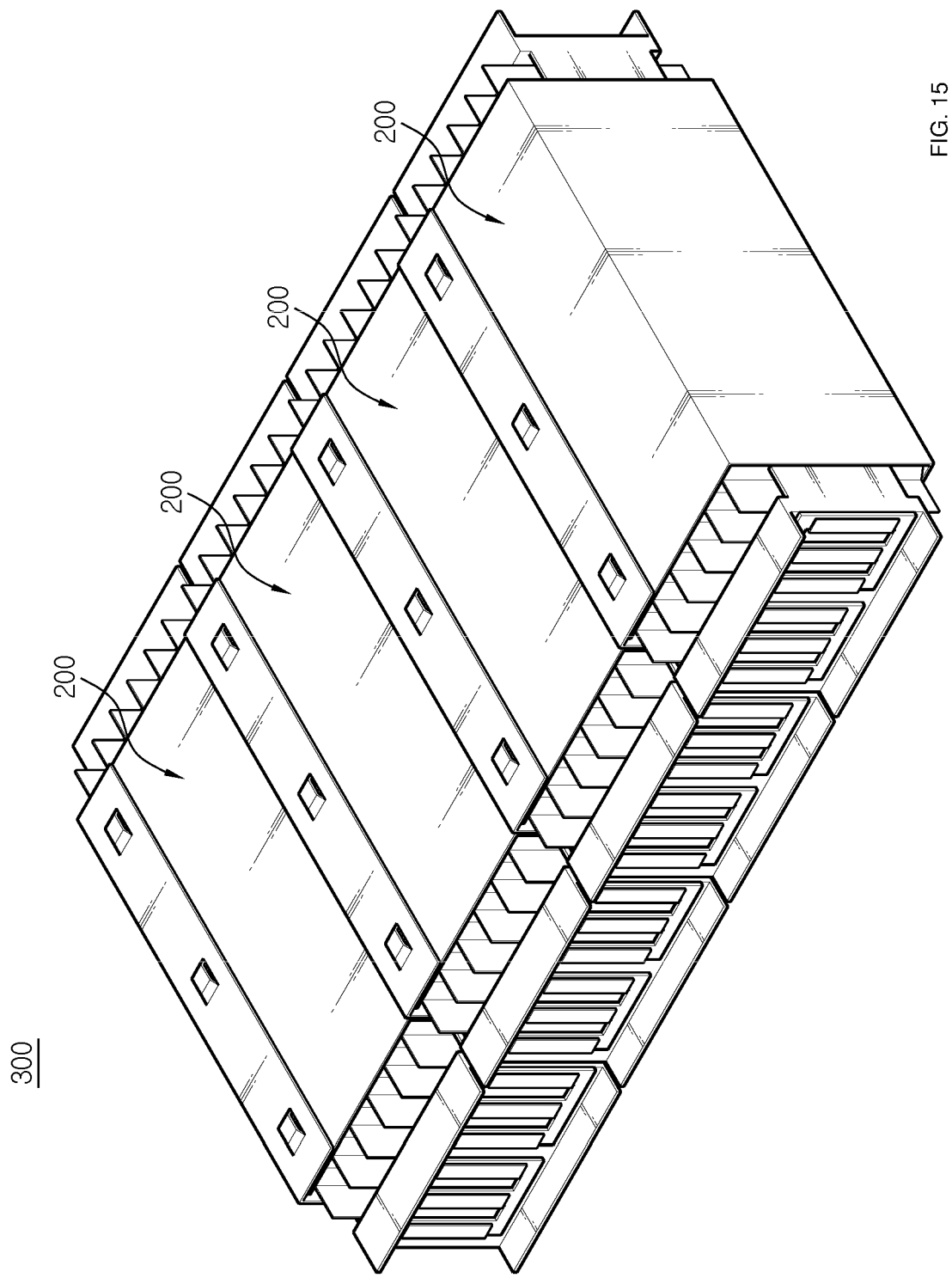
FIG. 15 is a perspective view schematically showing battery pack including two or more battery modules according to another embodiment of the present disclosure.

FIG. 15 is a partial perspective view schematically showing battery pack including two or more battery modules according to another embodiment of the present disclosure.

Referring to FIG. 15, a battery pack 300 of the present disclosure may include a plurality of the battery modules 200. In addition, the plurality of battery modules 200 may be stacked in one direction. The plurality of battery modules 200 may be electrically connected in series and/or in parallel using a separate bus bar (not shown).

Also, in addition to the battery module 200, the battery pack 300 may further include various devices for controlling charge and discharge of the battery assembly 210, for example a battery management system (BMS, not shown), a current sensor (not shown), a fuse (not shown), and the like.

In addition, the battery module 200 according to the present disclosure may be applied to a vehicle such as an electric vehicle or a hybrid electric vehicle. That is, the vehicle according to the present disclosure may include the battery module 200.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

200: battery module
100: secondary battery
210: battery assembly
220: module housing
220a, 220b, 220c, 220d, 220e, 220f: front side, rear side, upper side, lower side, left side, right side
221, 226: first frame, second frame
250: bus bar assembly
223: male-female coupling unit
225: welding coupling unit
230A, 230B: fixing clip
223h, 223t: fixing hole, fixing bolt
227: guide protrusion
240: thermal conductive adhesive
229: inner wall
300: battery pack

INDUSTRIAL APPLICABILITY

The present disclosure relates to a battery module including a module housing. Also, the present disclosure is available for industries related to a battery pack and a vehicle including the battery module.

What is claimed is:

1. A battery module, comprising:
a battery assembly configured to include a plurality of secondary batteries and have a front side, a rear side, an upper side, a lower side, a left side and a right side; and
a module housing including a first frame located at the left side of the battery assembly and having a plate shape with opposing ends bent rightward so that bent portions of the opposing ends of the first frame are respectively located at the upper side and the lower side of the battery assembly to surround at least a portion of each of the upper side and the lower side of the battery assembly, and a second frame located at the right side of the battery assembly and having a plate shape with opposing ends bent leftward so that bent portions of the opposing ends of the second frame are respectively located at the upper side and the lower side of the battery assembly to surround at least a portion of each of the upper side and the lower side of the battery assembly and are coupled with the bent portions of the first frame, respectively, wherein ends of the bent portions of the first frame are overlapped with ends of the bent portions of the second frame, respectively, such that the ends of the first frame extend beyond the ends of second frame in a coupling direction, wherein a male-female coupling unit having a male-female coupling structure is respectively provided to the overlapped ends of the bent portions of the first frame and the second frame to restrict movement of the first frame and the second frame relative to each other, and wherein the male-female coupling structure includes a first convex structure protruding outward at the ends of the bent portions of the first frame and a second convex structure protruding outward at the ends of the bent portions of the second frame, wherein the first convex structure is recessed to receive the second convex structure so as to restrict movement of the first frame and the second frame relative to each other in the coupling direction.

2. The battery module according to claim 1,
wherein a welding coupling unit is respectively provided to the overlapped ends of the bent portions of the first frame and the second frame so that the first frame and the second frame are coupled to each other by welding.

3. The battery module according to claim 1,
wherein a separately connectable structure is added to the male-female coupling unit so as to be fitted into the male-female coupling structure.

4. The battery module according to claim 3,
wherein the male-female coupling unit has a fixing hole perforated in the male-female coupling structure of the first frame and the second frame, and wherein the separately connectable structure is a fixing bolt inserted through the fixing hole.

5. The battery module according to claim 3,
wherein the separately connectable structure is a fixing clip.

6. The battery module according to claim 1,
wherein at least one of the first frame and the second frame has a guide protrusion formed at an inner surface thereof facing the battery assembly in an inwardly protruding form to press one side of the plurality of secondary batteries.

7. The battery module according to claim 1,
wherein a thermal conductive adhesive is added to an inner surface of at least one of the first frame and the second frame so as to be bonded and fixed to the plurality of secondary batteries.

8. The battery module according to claim 1,
wherein an inner wall is formed at an inner side of the first frame or the second frame to extend from an inner upper portion to an inner lower portion thereof.

9. A battery pack, comprising two or more of the battery modules according to claim 1.

10. A vehicle, comprising the battery pack according to claim 9.

11. The battery module according to claim 1,
wherein the first convex structure includes an opening formed at one side thereof, and the second convex structure has a protrusion configured to be inserted into the opening of the first convex structure.

\* \* \* \* \*